United States Patent
Osumi et al.

(10) Patent No.: US 6,543,786 B2
(45) Date of Patent: Apr. 8, 2003

(54) INSTALLATION STRUCTURE OF LIP TYPE SEAL

(75) Inventors: Shiro Osumi, Takahashi (JP); Naoki Hayakawa, Takahashi (JP); Takanobu Matsumoto, Takahashi (JP); Yamada Takeshi, Kariya (JP); Imai Takayuki, Kariya (JP)

(73) Assignees: Eagle Industry Co., Ltd., Tokyo (JP); Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/801,860

(22) Filed: Mar. 9, 2001

(65) Prior Publication Data

US 2002/0003338 A1 Jan. 10, 2002

(30) Foreign Application Priority Data

Mar. 10, 2000 (JP) .......................... 2000-066415

(51) Int. Cl.[7] ................................. F16J 15/32
(52) U.S. Cl. .................. 277/549; 277/346; 277/353; 277/562
(58) Field of Search ................. 277/346, 353, 277/500, 520, 549, 562, 570

(56) References Cited

U.S. PATENT DOCUMENTS

| | | | | |
|---|---|---|---|---|
| 4,623,153 A | * | 11/1986 | Nagasawa | 277/551 |
| 5,678,828 A | * | 10/1997 | Hamaya | 277/346 |
| 5,860,656 A | * | 1/1999 | Obata et al. | 277/549 |
| 6,029,980 A | * | 2/2000 | Downes | 277/552 |
| 6,244,600 B1 | * | 6/2001 | Leturcq | 277/353 |

* cited by examiner

*Primary Examiner*—Anthony Knight
*Assistant Examiner*—E Peavey
(74) *Attorney, Agent, or Firm*—Jacobson Holman PLLC

(57) ABSTRACT

A lip type seal (3A) has an annular casing (31), a plurality of seal lips (32, 34) and a rear surface support ring (35) arranged at the rear side. The casing (31) is installed to an inner circumferential surface of a seal installation part (1a) of a shaft hole housing (1) of an equipment through a main gasket (36) made of rubber state elastic material. An inner circumferential part of the seal lips (32, 34) is closely contacted with an outer circumferential surface of a rotary shaft (2). A sub-gasket (41) made of a material having a $CO_2$ transmission coefficient being smaller than that of rubber material is interposed between the rear surface support ring (35) and the shaft hole housing (1).

17 Claims, 9 Drawing Sheets

INSTALLATION STRUCTURE OF LIP TYPE SEAL

FIELD OF THE INVENTION

The present invention relates to installation structure of a lip type seal which seals a circumferential surface of a rotary shaft of various sorts of equipment.

PRIOR ART

In the prior art, as an installation structure of a lip type seal, ones as shown in FIG. 15 and FIG. 16 are known. In these figures, reference numeral 101 designates a shaft hole housing of a equipment such as a compressor of a refrigerator in an air conditioner, numeral 102 designates a rotary shaft inserted in an inner circumference of the shaft hole housing 101, and numeral 200 designates a lip type seal which is installed to a seal installation part 101a formed on the inner circumferential surface of the shaft hole housing 101 and seals the shaft circumference of the rotary shaft 102.

The lip type seal 200 shown in FIG. 15 is provided on an inner circumference of an annular casing 201 made of metal with a main seal lip 202 made of rubber material, a resin seal lip 203 made of a low friction resin material and arranged at the rear side of the main seal lip 202, and a rear surface support ring 204 made of metal and arranged further at the rear side of the resin seal lip 203. The casing 201 is tightly fitted to the seal installation part 101a of the shaft hole housing 101 through an O-ring 205 made of rubber material. The inner circumferential part of the seal lips 202, 203 curved and extending to the side of a sealed space S1 within the machine is closely contacted with the outer circumferential surface of the rotary shaft 102.

Also in the lip type seal 200 shown in FIG. 16, an outer circumferential part of a main seal lip 202 is joined integrally with a casing 201. The casing 201 is tightly fitted to an inner circumferential surface of a seal installation part 101a of a shaft hole housing 101 through a close contact seal part 206 formed in continuation with the outer circumferential part of the main seal lip 202 made of rubber material. Other parts are constituted substantially in a similar manner to FIG. 15.

In recent years, a refrigerant circulated in a refrigeration cycle of an air conditioner has been changed to freon R134a not including chrorine which destroys an ozone layer in the stratosphere. In the freon R134a, a warming coefficient of absorbing a long wave (infrared) radiation from the ground surface and bringing the greenhouse effect is large. That is, the freon R134a is a greenhouse effect gas which may bring the earth warming even if quite little amount leaks in the air. Therefore, as a refrigerant as above described, changing is being studied from R134a to $CO_2$ (carbon dioxide) in which a warming coefficient is relatively small.

The lip type seal in the conventional structure as above described, is excellent in the gas resisting transmission property for the freon gas and exhibits a good seal performance. In $CO_2$, however, since the transmission property for rubber material is high, when such lip type seal is used in a shaft seal device of a compressor of a refrigerator where $CO_2$ is a refrigerant, refrigerant $CO_2$ of high pressure compressed within the machine easily transmits the O-ring 205 or the close contact seal part 206 made of rubber material and leaks to the outside A of the machine.

SUMMARY OF THE INVENTION

An object of the present invention is to provide installation structure of a lip type seal which can exhibit a seal performance excellent for $CO_2$.

According to one mode of the present invention, the equipment has a rotary shaft and a housing, and a lip type seal is installed between the housing and the rotary shaft. The installation structure of the lip type seal has a casing having an annular outer circumferential part, a seal lip which is held to the inside of or held integrally with the annular outer circumferential part of the casing and seals the circumferential surface of the rotary shaft, a main gasket provided between the outside of the annular outer circumferential part of the casing and the inner circumferential surface of the housing so as to prevent the leakage of $CO_2$, and a sub-gasket provided at the downstream of $CO_2$ which leaks from the main gasket so as to prevent $CO_2$ from leaking to the side of the outer atmosphere. It is preferable that the sub-gasket is made of a material having a $CO_2$ permeability coefficient smaller than that of rubber material. The sub-gasket is arranged between the annular outer circumferential part of the casing and the inner circumferential surface of the housing.

According to another mode of the present invention, the sub-gasket is small in thickness in the, direction orthogonal to the gas transmission direction in comparison with the main gasket.

It is preferable that the sub-gasket is arranged between a rear plate extending from the annular outer circumferential part of the casing toward the rotary shaft and an opposite inner surface of the housing being opposite to the rear plate. A great portion of the rear plate extends substantially in the orthogonal direction to the axial center of the rotary shaft.

The sub-gasket is a ring such as an O-ring, a square ring or a hollow metal ring.

According to the further other mode of the present invention, the sub-gasket is a rubber sheet. For example, the sub-gasket is a rubber sheet arranged in a belt-shaped groove formed in the opposite inner surface of the housing. Otherwise, the sub-gasket is a rubber sheet provided at a rear surface of the rear plate.

The main gasket is formed in continuation with the seal lip. Otherwise, the main gasket is provided separately from the seal lip.

The main gasket is an O-ring or a close contact seal part.

In the further still other mode of the present invention, the sub-gasket is a ring made of a material (for example, resin) having a $CO_2$ transmission coefficient ($CO_2$ leakage coefficient) smaller than that of rubber material of an O-ring being the main gasket.

Also, the sub-gasket may be that having a small $CO_2$ transmission amount by making the thickness small in the direction orthogonal to the gas transmission direction in comparison with the main gasket (for example, that in a sheet shape).

A structure according to still another mode of the present invention is an installation structure of a lip type seal, where an outer circumferential part of a seal lip is held to or provided integrally with an annular case, and the case is tightly fitted to an inner circumferential surface of a housing of an equipment through a main gasket provided in continuation with or separately from the seal lip, and an inner circumferential part of the seal lip is closely contacted with the outer circumferential surface of a rotary shaft which is inserted in the inner circumference of the housing, characterized in that a sub-gasket made of a material having a $CO_2$ transmission coefficient smaller than that of rubber material is interposed between the case or the rear plate provided on the case and the opposite surface of the housing.

A structure according to still another mode of the present invention is an installation structure of a lip type seal, where an outer circumferential part of a seal lip is held to or provided integrally with an annular case, and the case is tightly fitted to an inner circumferential surface of a housing of an equipment through a main gasket provided in continuation with or separately from the seal lip, and an inner circumferential part of the seal lip is closely contacted with the outer circumferential surface of a rotary shaft which is inserted in the inner circumference of the housing, characterized in that a sub-gasket having the small thickness in the direction orthogonal to the gas transmission direction in comparison with the main gasket is interposed between the case or a rear plate provided in the case and the opposite surface of the housing.

A typical example of the equipment to which the present invention is applied, is a compressor of a refrigerator. The present invention can be applied also to other equipment.

In addition, in the present specification, "front side" means the side of a sealed space, and "rear surface" means a surface facing the opposite side to the sealed space, and "rear side" means the opposite side to the sealed space.

FIRST EMBODIMENT

Figure 1:
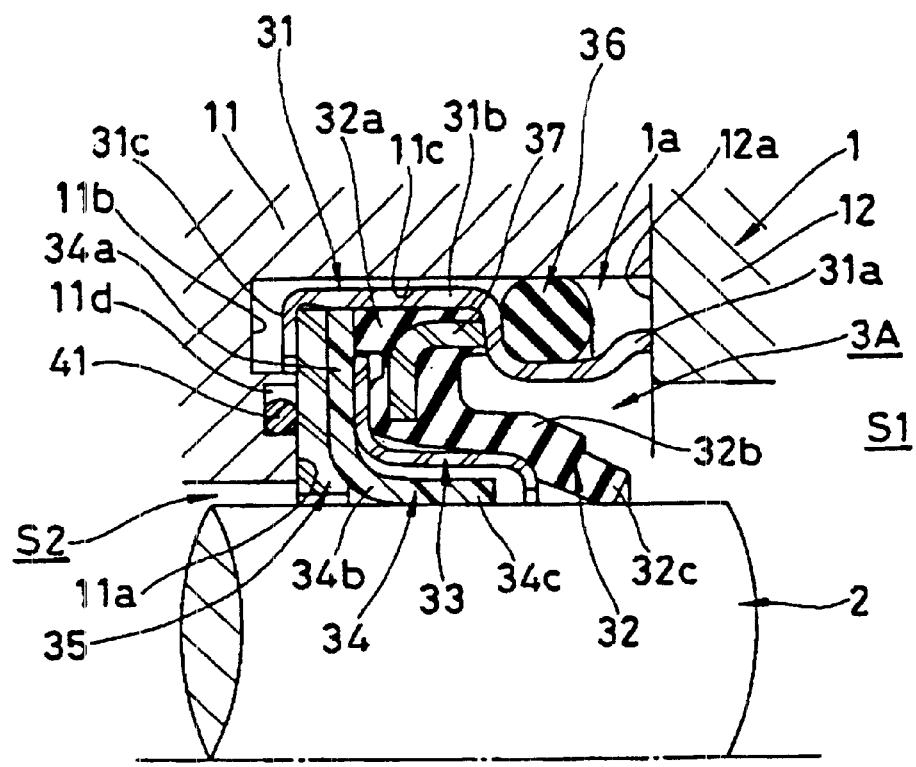
FIG. 1 is a semi sectional view showing the first embodiment of the invention. Where an installation structure of a lip type seal with a gasket being a separate body from a main seal lip is shown in section by a plane passing through the axial center.
Figure 2:
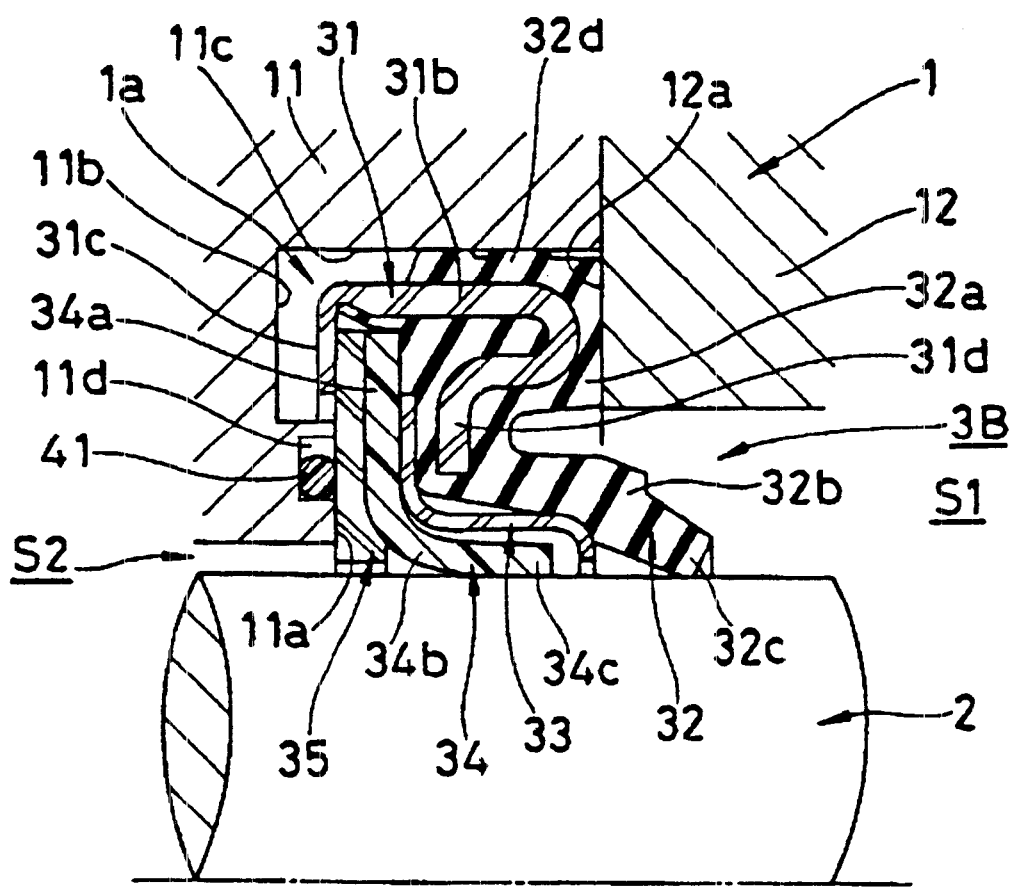
FIG. 2 is a semi sectional view showing the first embodiment of the invention. Where an installation structure of a lip type seal with a gasket formed in continuation with a main seal lip is shown in section by a plane passing through the axial center.

FIG. 1 and FIG. 2 show the first embodiment of the present invention. In these figures, reference numeral 1 designates a shaft hole housing of a compressor of a refrigerator using $CO_2$ as a refrigerant, numeral 2 designates a rotary shaft inserted in an inner circumference of the shaft hole housing 1, and numerals 3A, 3B designate a lip type seal which is installed at the inner circumference of the shaft hole housing and seals the shaft circumference of the rotary shaft 2.

The shaft hole housing 1 comprises a plurality of housing members 11, 12. A seal installation part 1a is formed between inner circumferential parts of the housing members 11, 12. The seal installation part 1a is surrounded by a support plane 11a formed in the housing member 11 and being a plane substantially orthogonal to the axial center, an annular recess 11b disposed at the outer circumferential side of the support plane 11a and retracted from the support plane 11a in the axial direction, a cylinder surface 11c extending from the outer circumference of the annular recess 11b to the side of a sealed space S1, and an end surface 12a of the housing member 12. The seal installation part 1a continues in the circumferential direction.

The lip type seals 3A, 3B have a casing 31 to be fixed to the cylinder surface 11c of the seal installation part 1a in the shaft hole housing 1. In the inner circumference of the casing 31, a main seal lip 32, a diameter direction support ring 33 supporting the main seal lip 32 from the rear side (inner circumferential side), a resin seal lip 34 arranged at the rear side of the diameter direction support ring 33, and a rear surface support ring 35 additively provided further at the rear side of the resin seal lip 34 are arranged in the state that respective outer diameter parts are closely contacted with each other.

The casing 31 is made of metal material such as steel material. In the lip type seal 3A shown in FIG. 1, the casing 31 has an O-ring installation part 31a formed in a recessed shape to the inner circumferential side at the end part of the front side and continued in the circumferential direction, a cylindrical main body part 31b extending from the O-ring installation part 31a to the rear side, and a caulking part 31c formed in bending to the inner diameter side at the end part of the rear side of the cylindrical main body part 31b. An O-ring 36 is a main gasket made of rubber state elastic material and installed at the outer circumferential surface of the O-ring installation part 31a. The casing 31 is tightly fitted to the cylinder surface 11c of the seal installation part 1a through the O-ring 36. The main seal lip 32, the diameter direction support ring 33, the resin seal lip 34 and the rear surface support ring 35 are held between the rear surfaces of the O-ring installation part 31a and the caulking part 31c in the state that respective outer diameter parts are closely contacted with each other.

The main seal lip 32 is made of rubber state elastic material. The main seal lip 32 has a base part 32a in which a reinforcing ring 37 made of metal and exhibiting a substantially L-shaped section is embedded, a main body part 32b extending in a curved state from the base part 32a to the inner diameter side and the front side, and a top end lip part 32c with the inner diameter edge slid to the outer circumferential surface of the rotary shaft 2.

Also, in the lip type seal 3B shown in FIG. 2, a close contact seal part 32d is vulcanized and bonded integrally to the outer circumferential surface of the front side part in the cylindrical main body part 31b of the casing 31. The close contact seal part 32d is a main gasket formed continuously from the base part 32a of the main seal lip 32. The casing 31 is tightly fitted to the cylinder surface 11c of the seal installation part 1a and the end surface 12a in the shaft hole housing 1 through the close contact seal part 32d.

Consequently, the O-ring installation part 31a in FIG. 1 does not exist in the casing 31, but the end part 31d at the front side is embedded in the base part 32a and also performs a function as the reinforcing ring 37 in FIG. 1.

The diameter direction support ring 33 is made of metal material such as steel material. The diameter direction support ring 33 is molded in a curved shape along the rear surface of the main seal lip 32. The top end part bent to the inner diameter side reaches the rear surface of the top end lip part 32c of the main seal lip 32. The diameter direction support ring 33 supports the main body part of the main seal lip 32 from the rear side, and restricts the diameter reduction deformation of the main seal lip 32 due to the pressure of refrigerant $CO_2$ in the sealed space S1 within the equipment.

The resin seal lip 34 is made of a low friction synthetic resin material such as PTFE (polytetrafluoroethylene). The outer diameter part of the resin seal lip 34 is grasped by the base part 32a of the main seal lip 32 and the outer diameter part of the diameter direction support ring 33 and the rear surface support ring 35, and extends in a curved state from the inner circumference of the resin seal lip 34 to the sealed space S1. The inner circumferential surface of the top end lip part 34c is slided with the outer circumferential surface of the rotary shaft 2 in the position that it is suitably retracted from the top end part of the diameter direction support ring 33 to the side of an atmosphere side space S2.

The rear surface support ring 35 is made of metal material such as steel material. The rear surface support ring 35 is formed in a disk-like shape, and supports the outer diameter part 34a and the curved part 34b of the resin seal lip 34 from the rear side.

In the lip type seal 3A shown in FIG. 1, the casing 31 is fitted to the seal installation part 1a of the shaft hole housing 1 through the O-ring 36. On the contrary, in the lip type seal 3B shown in FIG. 2, the casing 31 is fitted to the seal installation part 1a through the close contact seal part 32d formed integrally with the main seal lip 32. Both embodiments are different in this point, and other parts have similar constitutions to each other.

The outer diameter of the support plane 11a in the seal installation part 1a of the shaft hole housing 1 is smaller than that in the inner circumferential end part of the caulking part 31c in the casing 31. Height in the axial direction, in other words, depth in the axial direction of the annular recess 11b is formed in dimension larger than the thickness of the caulking part 31c. The caulking part 31c of the lip type seals 3A, 3B in the above-mentioned constitution is loosely fitted within the annular recess 11b, and load in the axial direction due to the pressure of the sealed space S1 within the equipment is supported by the abutting of the rear surface of the rear surface support ring 35 and the support plane 11a.

A groove 11d continuing in the circumferential direction is formed in the support plane 11a in the seal installation part 1a. A resin O-ring 41 molded by soft synthetic resin material with a $CO_2$ transmission coefficient quite smaller than rubber material, for example, by nylon, is installed as a sub-gasket to the groove 11d. Depth in the axial direction of the groove 11d is shallower than the wire diameter of the resin O-ring 41. Consequently, the resin O-ring 41 is interposed with the rear surface of the lip type seals 3A, 3B in the suitably compressed state in the axial direction.

In the above-mentioned constitution, the main gasket (that is, the O-ring 36 in the lip type seal 3A or the close contact seal part 32d integral with the main seal lip 32 in the lip type seal 3B) is supplied with a suitable tightening margin for the diameter direction between the shaft hole housing 1 and the casing 31. These lip type seals 3A, 3B are fixed firmly to the shaft hole housing 1 in the non-rotated state due to the frictional force possessed by rubber material. Further, the good seal property is secured for a lubricating oil (refrigerator oil) mixed in the mist state in refrigerant $CO_2$ gas within the equipment.

Even if the pressure of refrigerant $CO_2$ of the sealed space S1 becomes high significantly, due to the pressure, load in the axial direction acting on the lip type seal 3A or 3B is supported by the abutting of the rear surface support ring 35 and the support plane 11a in the shaft hole housing 1. Therefore, the rear surface support ring 35 is not subjected to the bending deformation so that it is deformed to the side of the atmosphere side space S2 with respect to the caulking part 31c as a fulcrum of the casing 31, and the normal installation attitude is held.

Also, rubber state elastic material to form the main gasket (the O-ring 36 or the close contact seal part 32d) has a high $CO_2$ transmission coefficient. Therefore, refrigerant $CO_2$ gas of high pressure existing in the sealed space S1 is transmitted through the O-ring 36 or the close contact seal part 32d and is apt to leak to the atmosphere side space S2. However, in the leakage passage of the O-ring 36 or the close contact seal part 32d from the rear side to the atmosphere side space S2, the resin O-ring 41 made of a material such as nylon having a quite small $CO_2$ transmission coefficient is interposed. Therefore, the leakage of refrigerant $CO_2$ gas is reduced effectively.

SECOND EMBODIMENT

Figure 3:
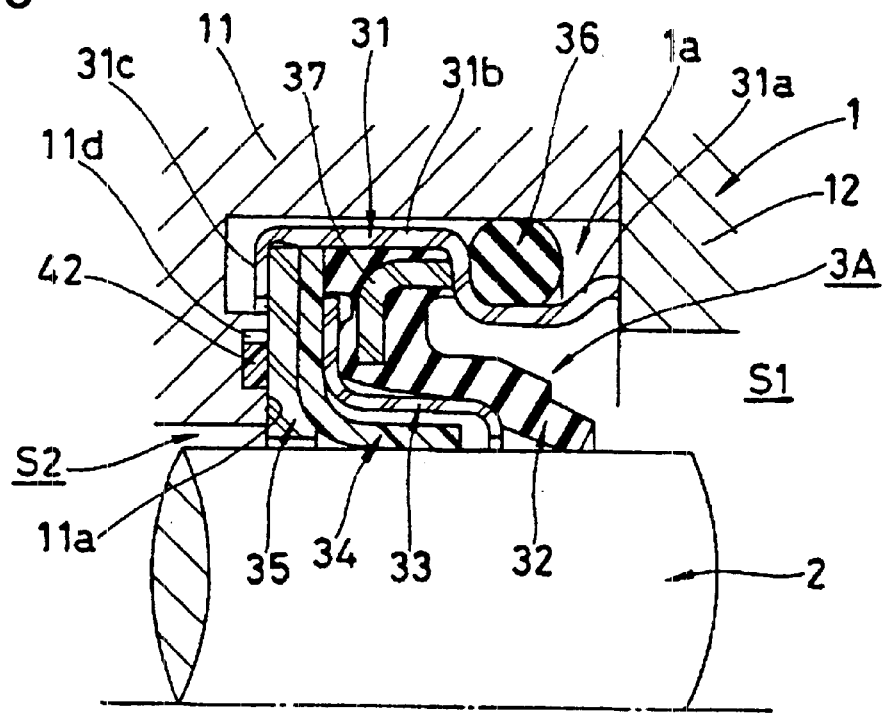
FIG. 3 is a semi sectional view showing the second embodiment of the invention. Where an installation structure of a lip type seal with a gasket being a separate body from a main seal lip is shown in section by a plane passing through the axial center.
Figure 4:
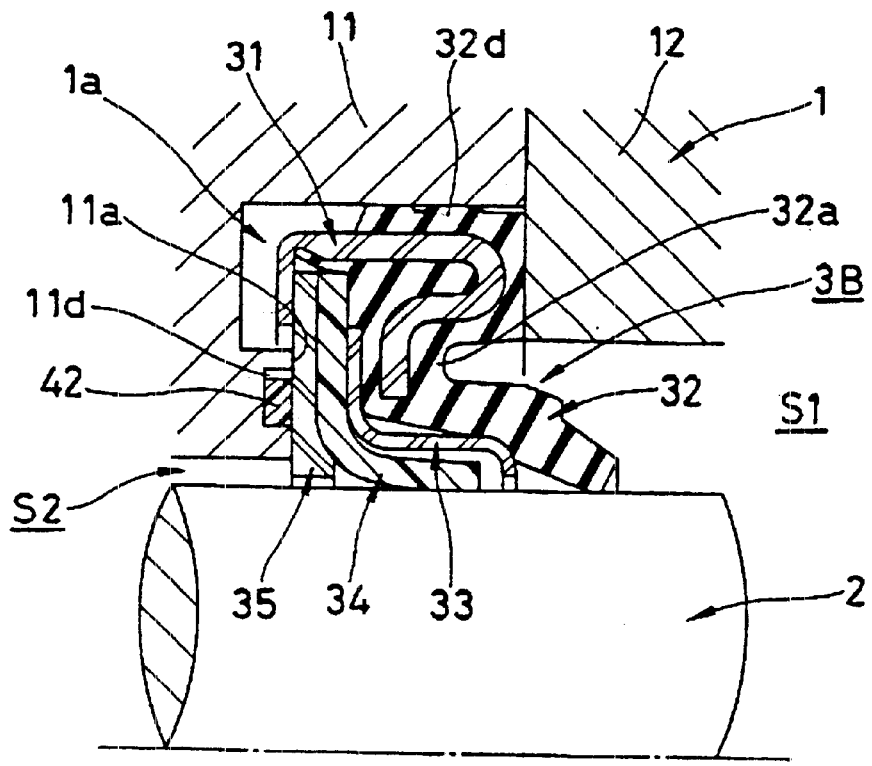
FIG. 4 is a semi sectional view showing the second embodiment of the invention. Where an installation structure of a lip type seal with a gasket formed in continuation with a main seal lip is shown in section by a plane passing through the axial center.

Next, FIG. 3 and FIG. 4 show the second embodiment of an installation structure of a lip type seal according to the present invention. A lip type seal 3A shown in FIG. 3 has an entirely similar constitution to that of FIG. 1, and a lip type seal 3B shown in FIG. 4 has an entirely similar constitution to that of FIG. 2.

The second embodiment is different from the first embodiment shown in FIG. 1 and FIG. 2 in that a resin square ring 42 is installed as a sub-gasket to a groove lid formed continuously in the circumferential direction to a support plane 11a in a shaft hole housing 1. Also, the resin square ring 42 is molded by soft synthetic resin material such as nylon having a $CO_2$ transmission coefficient quite smaller than that of rubber material, in a similar manner to that of the resin O-ring 41 in the first embodiment. Depth in the axial direction of the groove 11d is formed shallower than the thickness in the axial direction of the resin square ring 42. Consequently, the resin square ring 42 is interposed with the rear surface of the rear surface support ring 35 of the lip type seals 3A, 3B in a suitably compressed state in the axial direction. Therefore, the leakage of refrigerant $CO_2$ is reduced effectively.

THIRD EMBODIMENT

Figure 5:
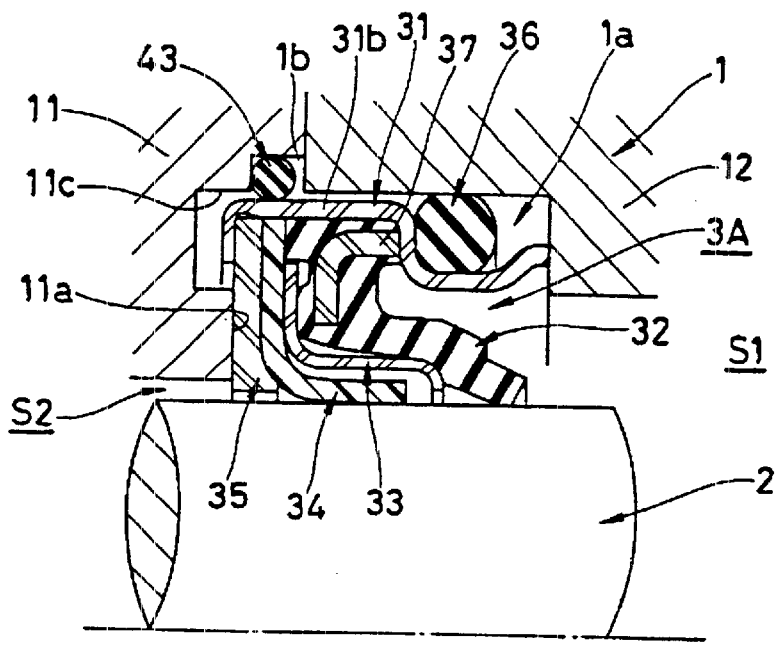
FIG. 5 is a semi sectional view showing the third embodiment of the invention. Where an installation structure of a lip type seal with a gasket being a separate body from a main seal lip is shown in section by a plane passing through the axial center.
Figure 6:
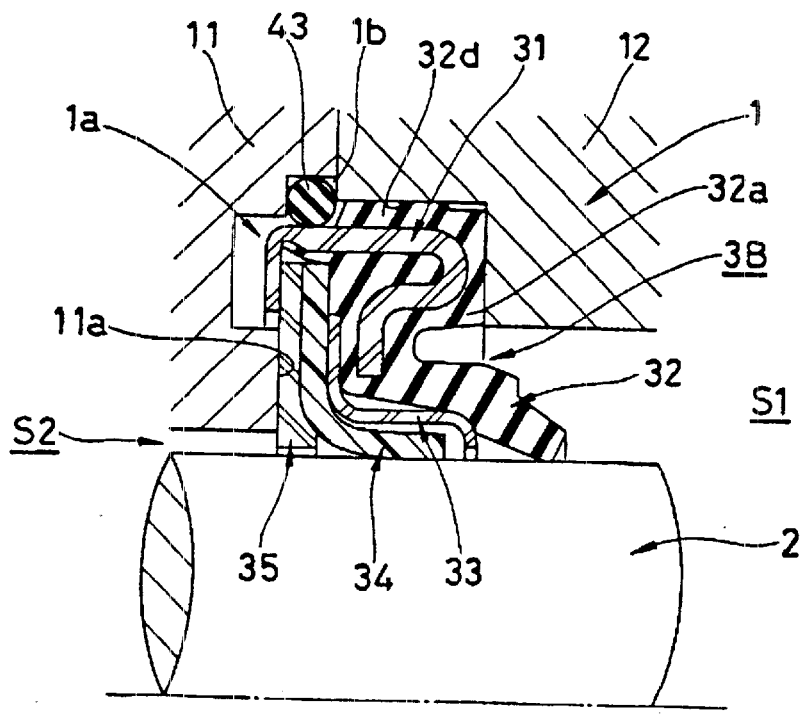
FIG. 6 is a semi sectional view showing the third embodiment of the invention. Where an installation structure of a lip type seal with a gasket formed in continuation with a main seal lip is shown in section by a plane passing through the axial center.

Next, FIG. 5 and FIG. 6 show the third embodiment of an installation structure of a lip type seal according to the present invention. A lip type seal 3A shown in FIG. 5 has an entirely similar constitution to that of FIG. 1, and a lip type seal 3B shown in FIG. 6 has an entirely similar constitution to that of FIG. 2.

The third embodiment is different from the first embodiment and the second embodiment in following points. That is, housing members 11, 12 in a shaft hole housing 1 are closely contacted and joined at the rear side from the close contact position with an O-ring 36 or a close contact seal part 32d. A groove 1b continuing in the circumferential direction is formed by the end part in the front side of a cylinder surface 11c of the housing member 11 to constitute a seal installation part 1a and the end surface in the rear side of the housing member 12. A resin O-ring 43 is provided as a sub-gasket within the groove 1b.

Also, the resin O-ring 43 in the third embodiment is molded by soft synthetic resin material such as nylon having a $CO_2$ transmission coefficient quite smaller than that of rubber material. Depth in the diameter direction of the groove 1b is formed shallower than the wire diameter of the resin O-ring 43. Consequently, the resin O-ring 43 is interposed with the outer circumferential surface of a cylindrical main body part 31b of the casing 31 in the lip type seals 3A, 3B in the suitably compressed state in the diameter direction. Therefore, the leakage of refrigerant $CO_2$ is reduced effectively.

In addition, in the first to third embodiment as above described, in the resin O-rings 41, 43 or the resin square ring 42, synthetic resin material other than nylon may be used as long as it has a $CO_2$ transmission coefficient significantly smaller than that of rubber material and a suitable elasticity. Also, the sectional shape is not limited to an O-ring shape or a square ring shape as shown in the figures, but various shapes such as a thin sheet shape in the axial direction may be used.

FOURTH EMBODIMENT

Figure 7:
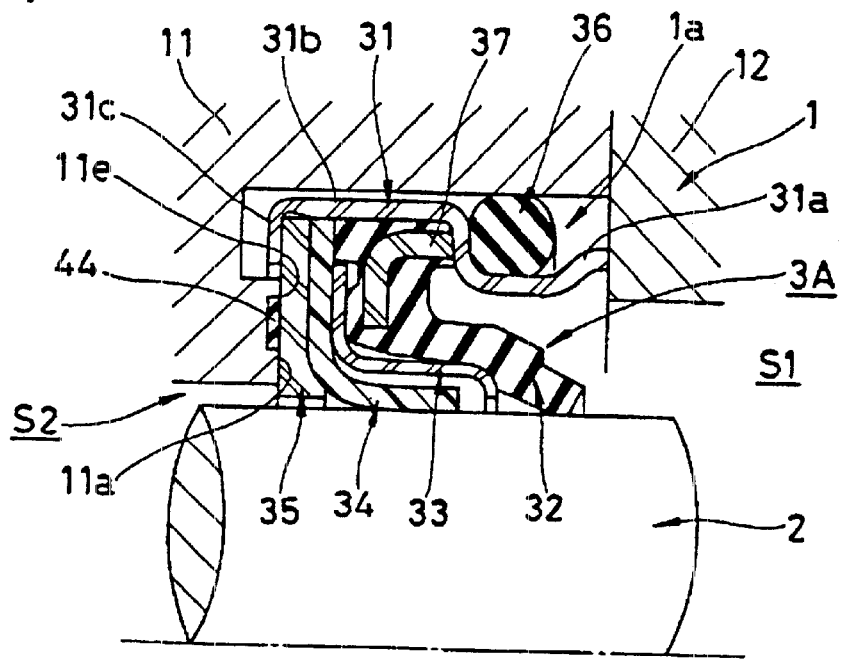
FIG. 7 is a semi sectional view showing the fourth embodiment of the invention. Where an installation structure of a lip type seal with a gasket being a separate body from a main seal lip is shown in section by a plane passing through the axial center.
Figure 8:
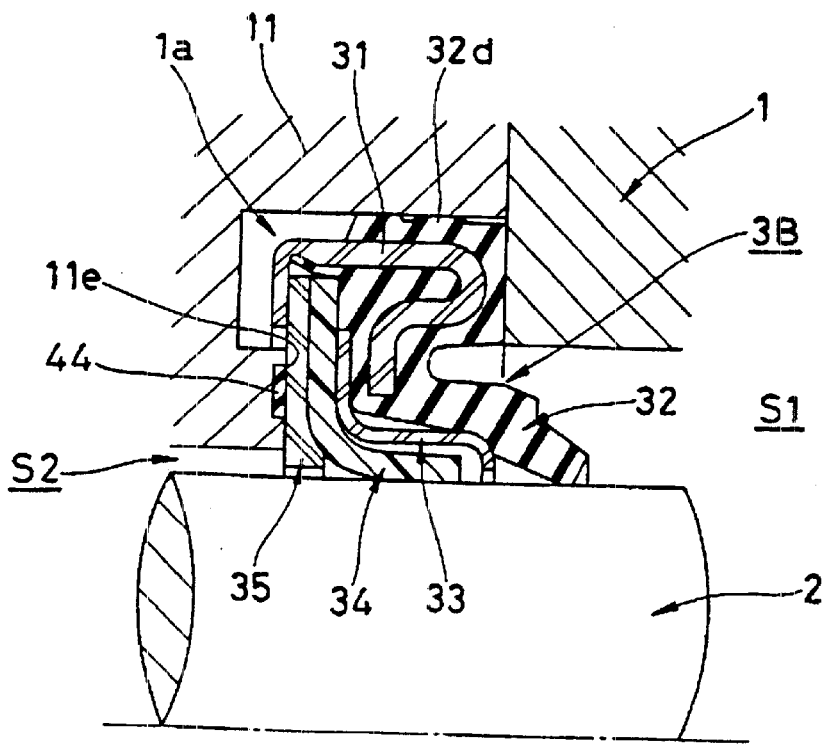
FIG. 8 is a semi sectional view showing the fourth embodiment of the invention. Where an installation structure of a lip type seal with a gasket formed in continuation with a main seal lip is shown in section by a plane passing through the axial center.

Next, FIG. 7 and FIG. 8 show the fourth embodiment of an installation structure of a lip type seal according to the present invention. A lip type seal 3A shown in FIG. 7 has an entirely similar constitution to that of FIG. 1, and a lip type seal 3B shown in FIG. 8 has an entirely similar constitution to that of FIG. 2.

The fourth embodiment is different from the first to third embodiments in that a rubber sheet 44 continuing in the circumferential direction and being thin in the axial direction is installed as a sub-gasket to a band-shaped groove 11e formed continuously in the circumferential direction to a support plane 11a in a shaft hole housing 1. The rubber sheet 44 is molded by rubber material, and its thickness in the axial direction is formed sufficiently smaller than thickness in the direction orthogonal to the $CO_2$ transmission direction in an O-ring 36 or a close contact seal part 32d of a main seal lip 32 as a main gasket, that is, thickness between a casing 31 and the close contact surface with a shaft hole housing member 1. The thickness less than 0.5 mm is preferable. Depth in the axial direction of the belt-shaped groove 11e is shallower than the thickness in the axial direction of the rubber sheet 44. Consequently, the rubber sheet 44 is interposed with the rear surface of the rear surface support ring 35 of the lip type seals 3A, 3B in a suitably compressed state in the axial direction.

In the rubber sheet 44, the lip type seals 3A, 3B are not fixed by a large tightening margin, as in the O-ring 36 or the close contact seal part 32d of the main seal lip 32. Therefore, the thickness in the axial direction, in other words, the thickness in the direction orthogonal to the $CO_2$ transmission direction may be made as thin as 0.5 mm or less. Moreover, since the rubber sheet 44 has a small diameter in comparison with the O-ring 36 or the close contact seal part 32d of the main seal lip 32, the contact area to refrigerant $CO_2$ from the outer circumferential side becomes significantly small. Consequently, although rubber material itself to form the rubber sheet 44 has a $CO_2$ transmission coefficient being large in comparison with nylon or the like, the absolute quantity of the transmission of refrigerant $CO_2$ becomes significantly small. Therefore, the leakage of refrigerant $CO_2$ can be reduced effectively.

FIFTH EMBODIMENT

Figure 9:
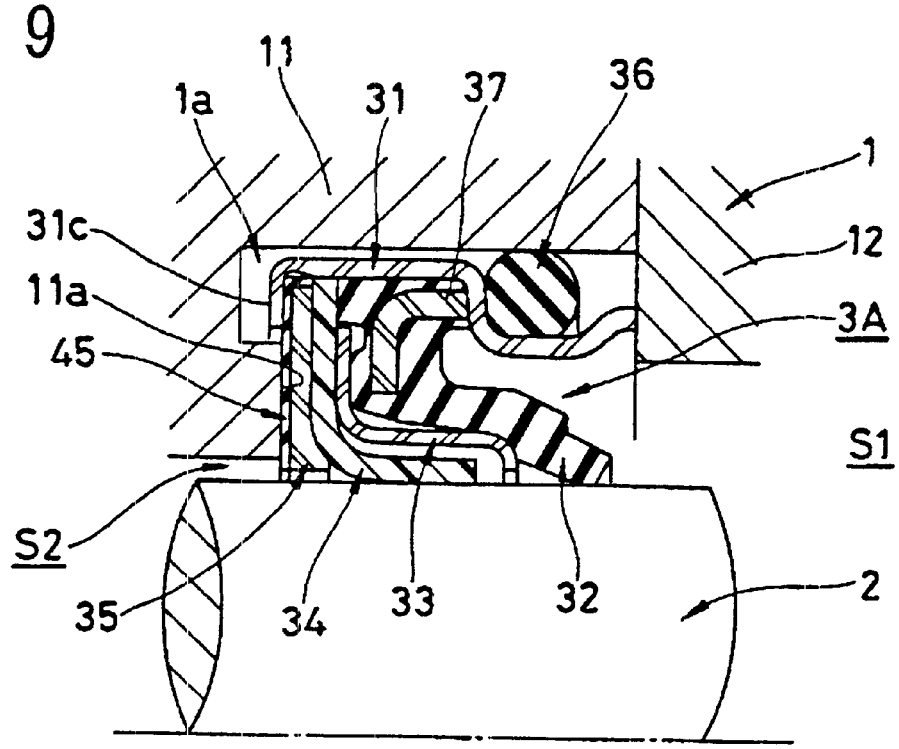
FIG. 9 is a semi sectional view showing the fifth embodiment of the invention. Where an installation structure of a lip type seal with a gasket being a separate body from a main seal lip is shown in section by a plane passing through the axial center.
Figure 10:
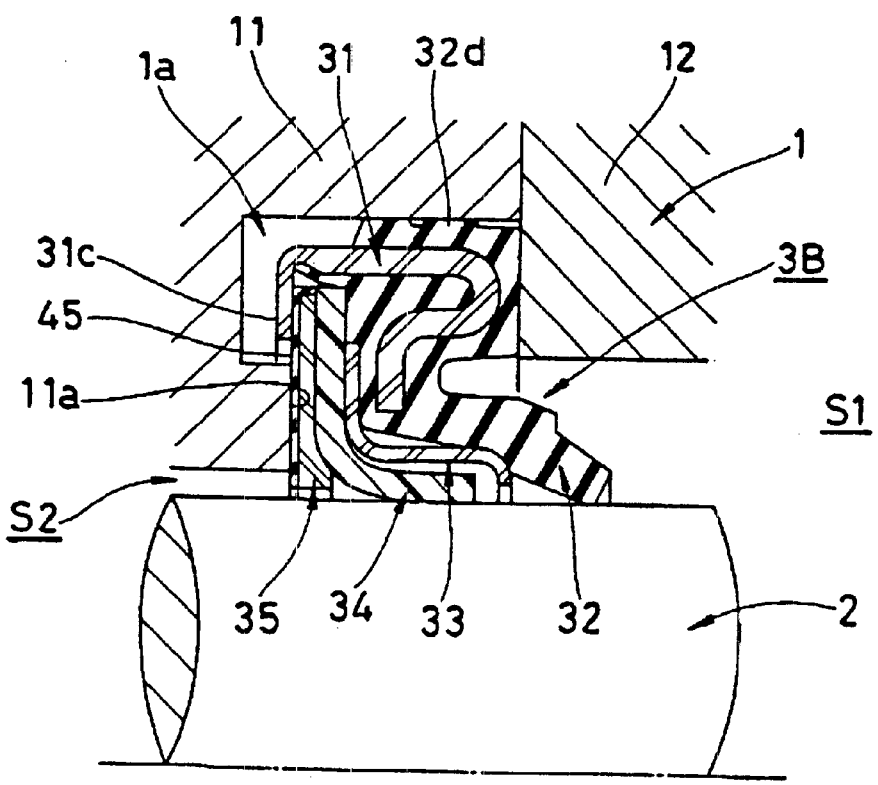
FIG. 10 is a semi sectional view showing the fifth embodiment of the invention. Where an installation structure of a lip type seal with a gasket formed in continuation with a main seal lip is shown in section by a plane passing through the axial center.

Next, FIG. 9 and FIG. 10 show the fifth embodiment of an installation structure of a lip type seal according to the present invention.

A lip type seal 3A shown in FIG. 9 has a basically similar constitution to that of FIG. 1.

A lip type seal 3B shown in FIG. 10 has a basically similar constitution to that of FIG. 2, but it is different from this in that a thin rubber sheet 45 as a sub-gasket is bonded to the whole rear surface of the rear surface support ring 35.

In the fifth embodiment, in place of the rubber sheet 44 installed to the support plane 11a of the shaft hole housing 1 in the state shown previously in FIG. 7 and FIG. 8, the rubber sheet 45 is bonded to the rear surface of the rear surface support ring 35. A support plane 11a becomes a flat surface where a groove does not exist.

The thickness in the axial direction of the rubber sheet 45 is formed sufficiently smaller than the thickness in the direction orthogonal to the $CO_2$ transmission direction in an O-ring 36 or a close contact seal part 32d of a main seal lip 32 as a main gasket, that is, the thickness between a casing 31 and the close contact surface with a shaft hole housing member 1. It is preferable that the thickness is made as thin as 0.5 mm or less. In the rubber sheet 45, the outer circumferential part is suitably compressed in the axial direction between the rear surface support ring 35 and a caulking part 31c in the casing 31. The inner circumferential part is interposed in a suitably compressed state in the axial direction between the rear surface support ring 35 and the support plane 11a in a housing member 11. Consequently, also in this case, although a $CO_2$ transmission coefficient of the rubber sheet 45 itself is large in comparison with nylon or the like, the absolute quantity of the transmission of refrigerant $CO_2$ becomes significantly small. Therefore, the leakage of refrigerant $CO_2$ can be reduced effectively.

SIXTH EMBODIMENT

Figure 11:
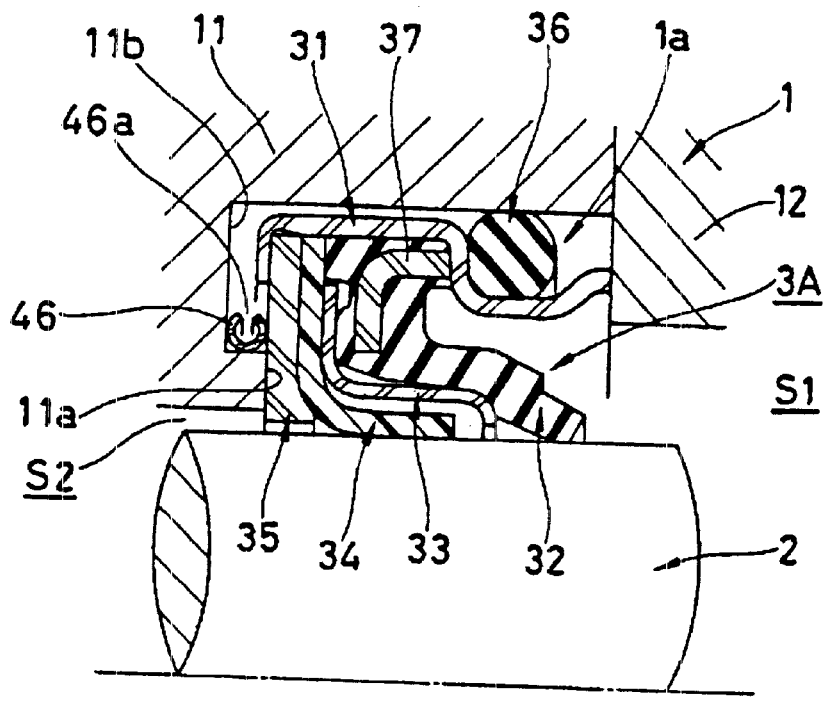
FIG. 11 is a semi sectional view showing the sixth embodiment of the invention. Where an installation structure of a lip type seal with a gasket being a separate body from a main seal lip is shown in section by a plane passing through the axial center.
Figure 12:
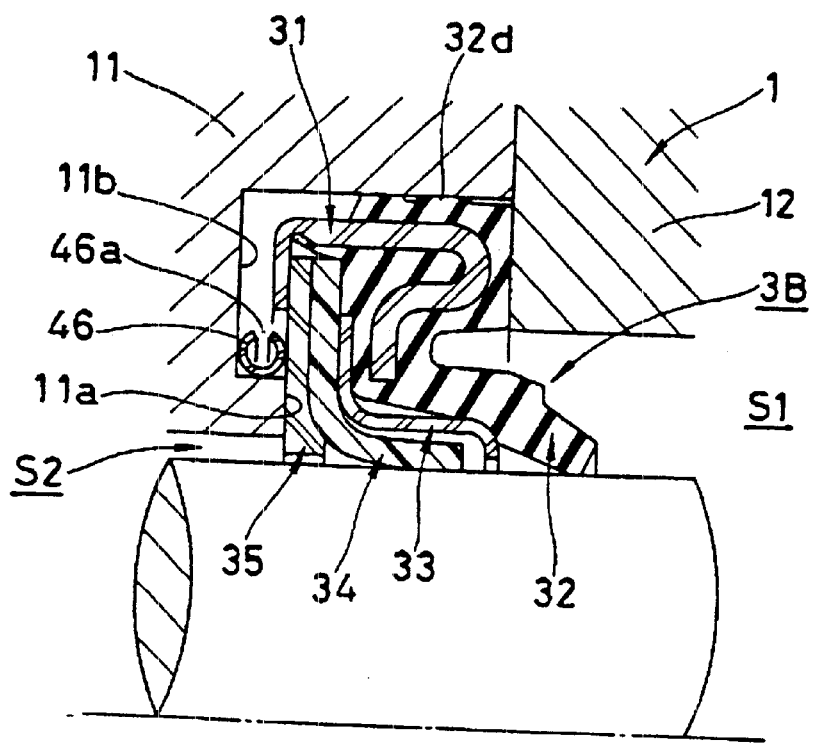
FIG. 12 is a semi sectional view showing the sixth embodiment of the invention. Where an installation structure of a lip type seal with a gasket formed in continuation with a main seal lip is shown in section by a plane passing through the axial center.

Next, FIG. 11 and FIG. 12 show the sixth embodiment of an installation structure of a lip type seal according to the present invention.

A lip type seal 3A shown in FIG. 11 has an entirely similar constitution to that of FIG. 1.

A lip type seal 3B shown in FIG. 12 has an entirely similar constitution to that of FIG. 2.

A hollow metal ring 46 as a sub-gasket is arranged in an annular step difference surface between a support plane 11a in a seal installation part 1a of a shaft hole housing 1 and an annular recess 11b at the outer circumference of the support plane 11a. The hollow metal ring 46 has a sectional shape in a substantially C-like shape. Its opening part 46a faces the side of the sealed object, that is, the outer circumferential side in this example, and the width in the axial direction in the non-installed state becomes slightly larger than the width in the axial direction of the annular step difference surface. A $CO_2$ transmission coefficient is substantially zero. Consequently, in the installation state, as shown in the figures, the hollow metal ring 46 is suitably compressed and is interposed in the close contact state between the annular recess 11b of the shaft hole housing 1 and the rear surface of the rear surface support ring 35 in the lip type seal 3A or 3B.

In the leakage passage from the rear side of an O-ring 36 or a close contact seal part 32d to an atmosphere side space S2, the hollow metal ring 46 is interposed where $CO_2$ can't be transmitted. Therefore, the leakage of refrigerant $CO_2$ gas is reduced effectively.

SEVENTH EMBODIMENT

Figure 13:
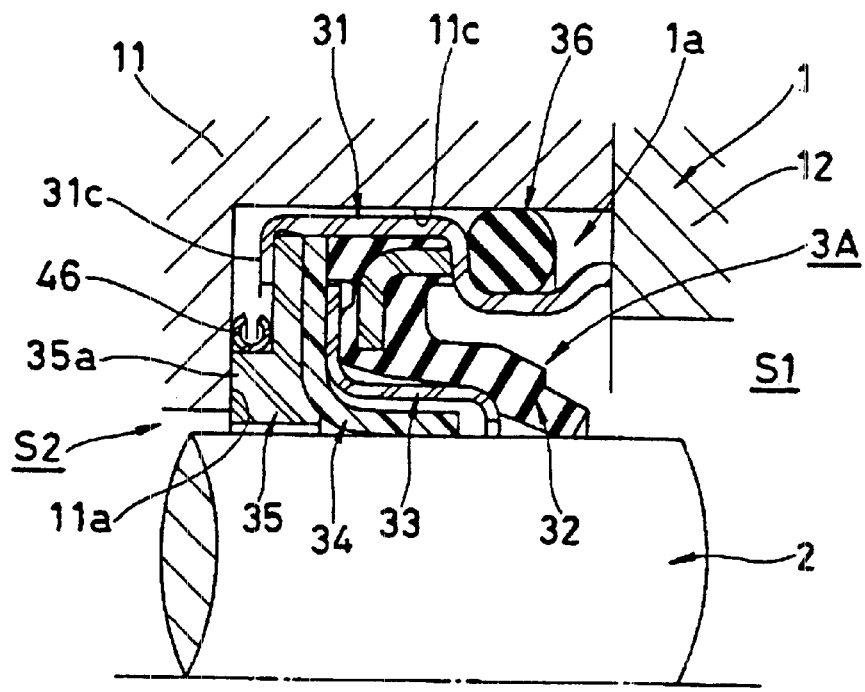
FIG. 13 is a semi sectional view showing the seventh embodiment of the invention. Where an installation structure of a lip type seal with a gasket being a separate body from a main seal lip is shown in section by a plane passing through the axial center.
Figure 14:
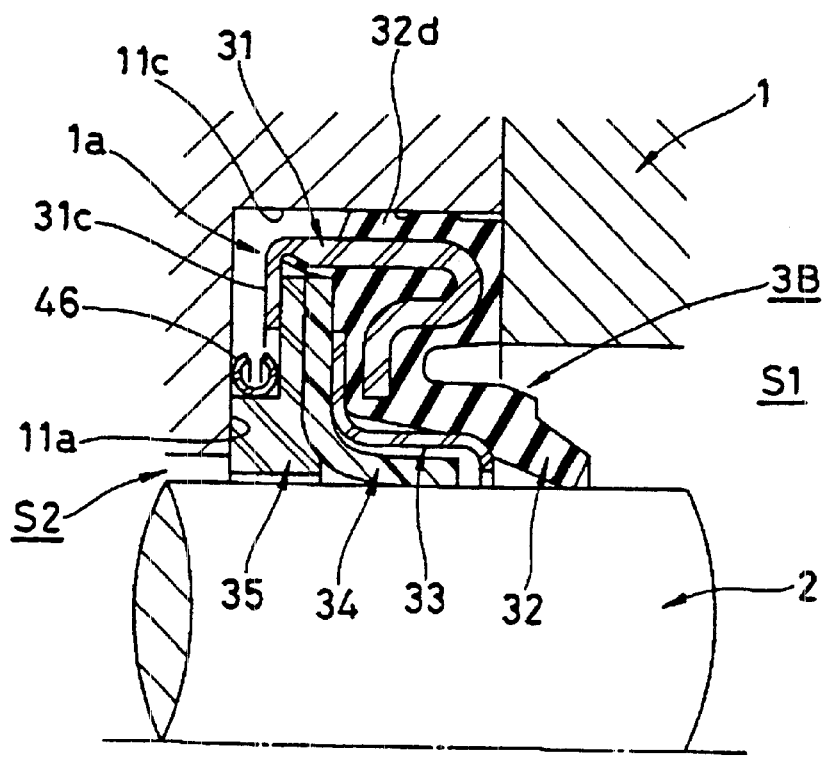
FIG. 14 is a semi sectional view showing the seventh embodiment of the invention. Where an installation structure of a lip type seal with a gasket formed in continuation with a main seal lip is shown in section by a plane passing through the axial center.
Figure 15:
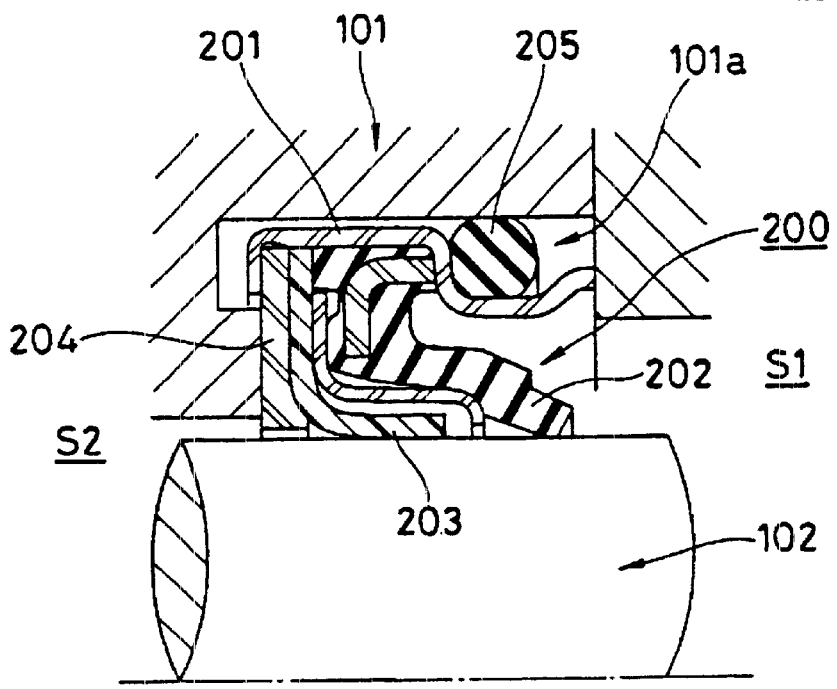
FIG. 15 is a semi sectional view showing an installation structure of a lip type seal with a gasket being a separate body from a main seal lip in the prior art.
Figure 16:
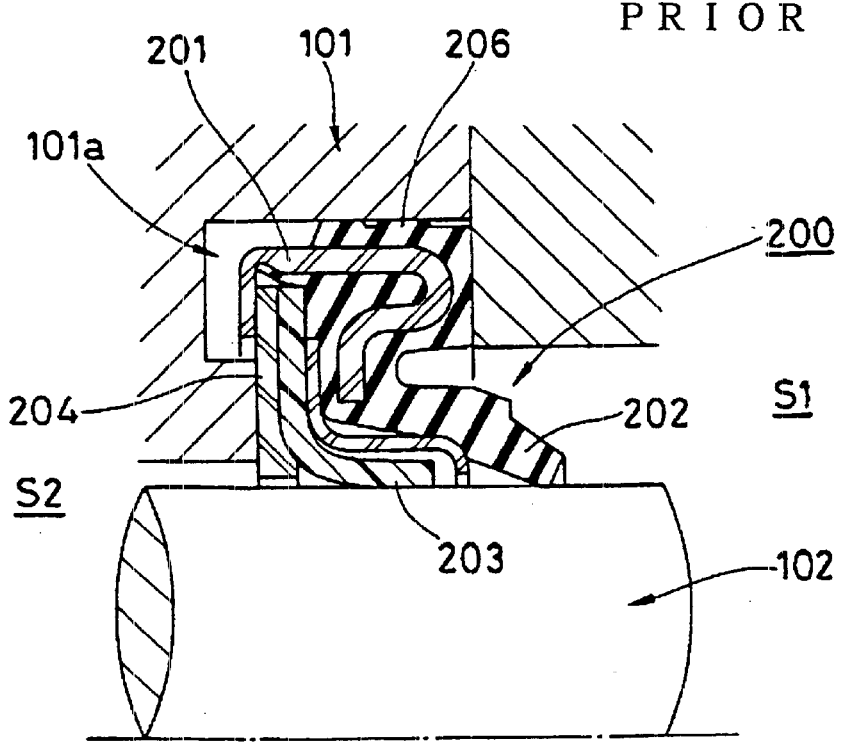
FIG. 16 is a semi sectional view showing an installation structure of a lip type seal with a gasket formed in continuity with a main seal lip in the prior art.

Next, FIG. 13 and FIG. 14 show the seventh embodiment of an installation structure of a lip type seal according to the present invention.

A lip type seal 3A shown in FIG. 13 has a basically similar constitution to that of FIG. 1.

A lip type seal 3B shown in FIG. 14 has a basically similar constitution to that of FIG. 2, but it is different in that an annular projection 35a is formed concentrically at the rear surface of the inner circumferential part of a rear surface support ring 35. The annular projection 35a has height in the axial direction more than the thickness of a caulking part 31a in a casing 31. On the other hand, a support plane 11a in a seal installation part 1a of a shaft hole housing 1 becomes a flat surface continuing to the end part of a cylinder surface 11c in the seal installation part 1a.

The annular projection 35a formed in the rear surface support ring 35 has a similar function to that of the support plane 11a relatively projected and formed to a housing member 11 by an annular recess 11b, in each embodiment shown in FIGS. 1 to 12. That is, even if the pressure of refrigerant $CO_2$ of a sealed space S1 becomes significantly high, the load in the axial direction acting to the lip type seal 3A or 3B due to the pressure is supported by the support plane 11a in the shaft hole housing 1 through the annular projection 35a of the rear surface support ring 35, thereby the bending deformation of the rear surface support ring 35 with respect to a caulking part 31c as a fulcrum of the casing 31 is prevented, and the normal installation attitude can be held.

A hollow metal ring 46 similar to that in FIG. 11 and FIG. 12 as already described is arranged as a sub-gasket on the outer circumferential surface of the annular projection 35a of the rear surface support ring 35, and the width in the axial direction in the non-installation state becomes slightly larger than the height in the axial direction of the annular projection 35a. Consequently, in the installation state, as shown in the figures, the hollow metal ring 46 is suitably compressed and interposed in the close contact state between the support plane 11a of the shaft hole housing 1 and the rear surface of the outer circumferential side of the annular projection 35a in the rear surface support ring 35. Therefore, the leakage of refrigerant $CO_2$ transmitted through an O-ring 36 or a close contact seal part 32d is reduced effectively.

In addition, in any of the first to seventh embodiments as above described, the sub-gasket is arranged to the atmosphere side from the gasket (the O-ring 36 or the close contact seal part 32d). However, for example, in the structure that an O-ring installation part 31a is formed in the end part of the rear side in the casing 31, the sub-gasket may be interposed between the shaft hole housing 1 and the casing 31 by a groove or the like at the side of the sealed space S1 from the installation position of the O-ring 36 or the like.

Also, in the first to fifth embodiments shown in FIGS. 1 to 10, the annular projection 35a may be formed at the rear surface of the rear surface support ring 35 and may be supported by the flat support plane 11a in the seal installation part 1a of the shaft hole housing 1, in a similar manner to that in FIG. 13 and FIG. 14.

According to the installation structure of the lip type seal of the present invention, the sub-gasket is made of a material having a $CO_2$ transmission coefficient smaller than that of rubber material, or the subgasket is small in thickness in the direction orthogonal to the gas transmission direction in comparison with the gasket, thereby the sub-gasket having a $CO_2$ transmission amount being small is provided. As a result, the seal performance excellent for $CO_2$ can be exhibited.

What is claimed is:

1. A structure comprising:
   a rotary shaft;
   a housing;
   a lip type seal installed between said housing and said rotary shaft;
   a casing having an annular outer circumferential part;
   a seal lip which is held or fixed to the inside of said annular outer circumferential part of said casing, and seals a circumferential surface of the rotary shaft;
   a main gasket provided in a sealing condition between said annular outer circumferential part of said casing and an inner surface of said housing so as to prevent leakage of $CO_2$, said annular outer circumferential part facing said inner surface of said housing;
   a sub-gasket provided in a sealing condition in a leakage passage of $CO_2$ so as to prevent leakage of $CO_2$ to the outer atmosphere side, if $CO_2$ is to leak from said main gasket; and
   a rear plate extending from said annular outer circumferential part of said casing toward said rotary shaft;
   said sub-gasket being placed between said casing or said rear plate and said inner surface of said housing.

2. The structure as set forth in claim 1, wherein said sub-gasket has a thickness in the direction orthogonal to the gas transmission direction, which is small in comparison with that of the main gasket.

3. The structure as set forth in claim 1, wherein said sub-gasket is arranged between said annular outer circumferential part of said casing and said inner circumferential surface of said housing.

4. The structure as set forth in claim 1, wherein said sub-gasket is arranged between a rear plate extending from said annular outer circumferential part of said casing toward said rotary shaft, and an opposite inner surface of said housing opposed to said rear plate.

5. The structure as set forth in claim 4, wherein said sub-gasket is a ring made of nylon.

6. The structure as set forth in claim 4, wherein said main gasket is provided separately from said seal lip.

7. The structure as set forth in claim 4, wherein said main gasket is an O-ring which is circular when viewed in a plan view.

8. The structure as set forth in claim 4, wherein said main gasket is a close contact seal part.

9. The structure as set forth in claim 1, wherein said sub-gasket is made of a material having a $CO_2$ transmission coefficient smaller than that of rubber material.

10. The structure as set forth in claim 1, wherein said sub-gasket is made of nylon.

11. A structure having a rotary shaft and a housing, and a lip type seal installed between said housing and said rotary shaft, said structure comprising:
   a casing having an annular outer circumferential part;
   a seal lip which is held or fixed to an inside portion of said annular outer circumferential part of said casing and sealing a circumferential surface of the rotary shaft;
   a main gasket provided between said annular outer circumferential part of said casing and an inner circumferential surface of said housing so as to prevent leakage of $CO_2$;
   a sub-gasket provided in a leakage passage of $CO_2$ so as to prevent leakage of $CO_2$ to the outer atmosphere side, if $CO_2$ leaks from said main gasket;
   said sub-gasket being made of a resin material having a $CO_2$ transmission coefficient smaller than that of rubber material
   a rear plate extending from said annular outer circumferential part of said casing toward said rotary shaft;
   said sub-gasket being placed between said casing or said rear plate and said inner surface of said housing.

12. The structure as set forth in claim 11, wherein said sub-gasket is a ring made of nylon and having an O-shape in cross section.

13. The structure as set forth in claim 11, wherein said sub-gasket is a ring made of nylon and having a square shape in cross section.

14. A structure having a rotary shaft and a housing, and a lip type seal installed between said housing and said rotary shaft, said structure comprising:
   a casing having an annular outer circumferential part;
   a seal lip which is held or fixed to the inside of said annular outer circumferential part of said casing and sealing a circumferential surface of the rotary shaft;
   a main gasket provided between said annular outer circumferential part of said casing and an inner circumferential surface of said housing so as to prevent leakage of $CO_2$;
   a sub-gasket provided in a leakage passage of $CO_2$ so as to prevent leakage of $CO_2$ to the outer atmosphere side, if $CO_2$ leaks from said main gasket wherein said sub-gasket is made of a material having a $CO_2$ transmission coefficient smaller than that of rubber material;
   said sub-gasket being a hollow metal ring.

15. A structure having a rotary shaft and a housing, and a lip type seal installed between said housing and said rotary shaft, said structure comprising:
   a casing having an annular outer circumferential part;
   a seal lip which is held or fixed to the inside of said annular outer circumferential part of said casing and sealing a circumferential surface of the rotary shaft;
   a main gasket provided between said annular outer circumferential part of said casing and an inner circumferential surface of said housing so as to prevent leakage of $CO_2$;
   a sub-gasket provided in a leakage passage of $CO_2$ so as to prevent leakage of $CO_2$ to the outer atmosphere side, if $CO_2$ leaks from said main gasket wherein said sub-gasket is made of a material having a $CO_2$ transmission coefficient smaller than that of rubber material wherein said sub-gasket is arranged between a rear plate extending from said annular outer circumferential part of said casing toward said rotary shaft, and an opposite inner surface of said housing opposed to said rear plate;
   said sub-gasket being a rubber sheet arranged in a belt-shaped groove formed in said opposite inner surface of said housing.

16. A structure having a rotary shaft and a housing, and a lip type seal installed between said housing and said rotary shaft, said structure comprising:
   a casing having an annular outer circumferential part;
   a seal lip which is held or fixed to the inside of said annular outer circumferential part of said casing and sealing a circumferential surface of the rotary shaft;
   a main gasket provided between said annular outer circumferential part of said casing and an inner circumferential surface of said housing so as to prevent leakage of $CO_2$;
   a sub-gasket provided in a leakage passage of $CO_2$ so as to prevent leakage of $CO_2$ to the outer atmosphere side, if $CO_2$ leaks from said main gasket wherein said sub-gasket is made of a material having a $CO_2$ transmission coefficient smaller than that of rubber material wherein said sub-gasket is arranged between a rear plate extending from said annular outer circumferential part of said casing toward said rotary shaft, and an opposite inner surface of said housing opposed to said rear plate;
   said sub-gasket being a rubber sheet provided at a rear surface of said rear plate.

17. A structure having a rotary shaft and a housing, and a lip type seal installed between said housing and said rotary shaft, said structure comprising:
   a casing having an annular outer circumferential part;
   a seal lip which is held or fixed to the inside of said annular outer circumferential part of said casing and sealing a circumferential surface of the rotary shaft;
   a main gasket provided between said annular outer circumferential part of said casing and an inner circumferential surface of said housing so as to prevent leakage of $CO_2$;
   a sub-gasket provided in a leakage passage of $CO_2$ so as to prevent leakage of $CO_2$ to the outer atmosphere side, if $CO_2$ leaks from said main gasket wherein said sub-gasket is made of a material having a $CO_2$ transmission coefficient smaller than that of rubber material wherein said sub-gasket is arranged between a rear plate extending from said annular outer circumferential part of said casing toward said rotary shaft, and an opposite inner surface of said housing opposed to said rear plate; said main gasket being formed in continuation with said seal lip.

* * * * *